Sept. 18, 1934.  M. H. SULLIVAN  1,974,127
BALL BEARING SPACER
Filed July 6, 1933
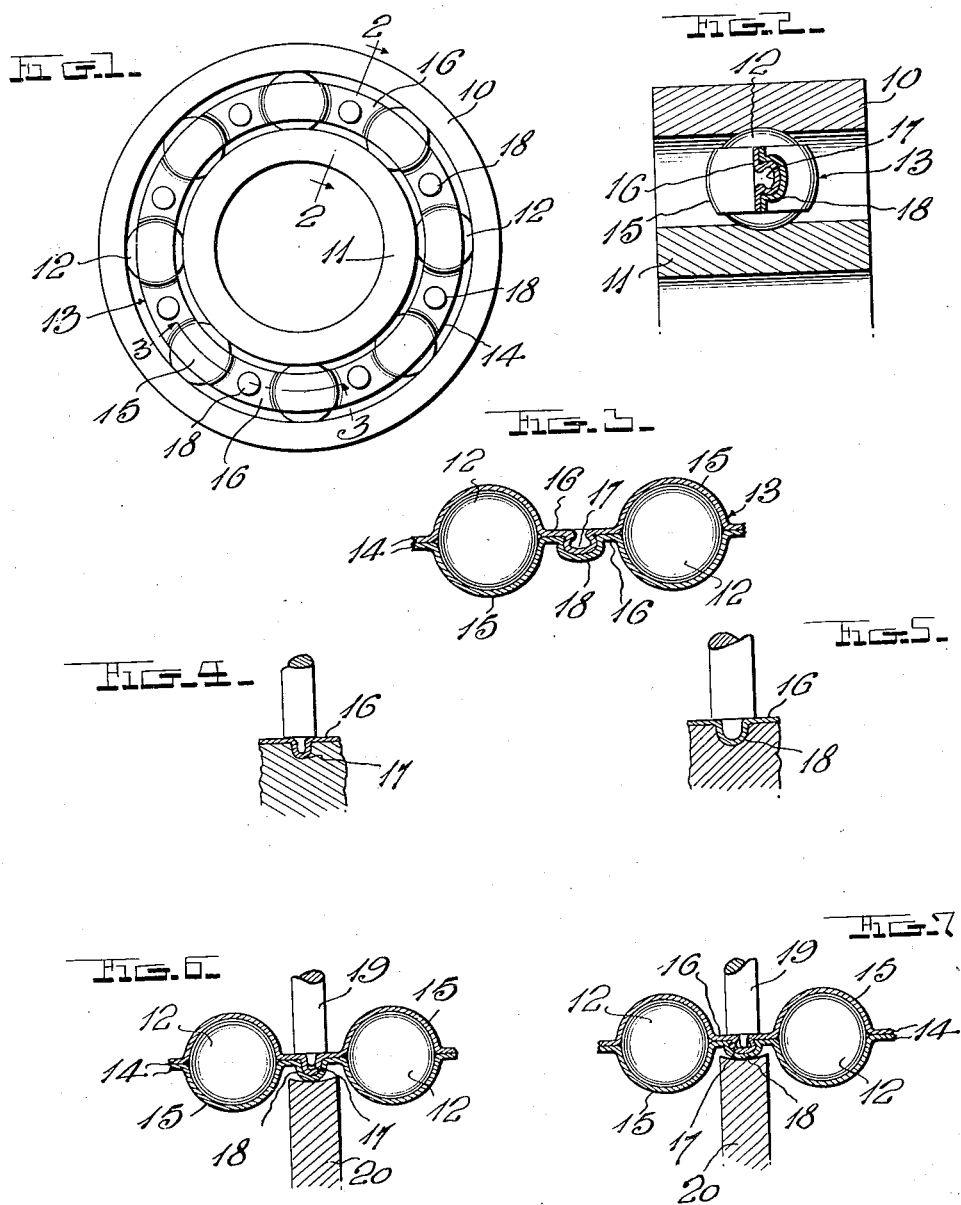
Inventor
Michael H. Sullivan
Witness
H. Woodard
By H. R. Williamson &co
Attorneys Patented Sept. 18, 1934

1,974,127

UNITED STATES PATENT OFFICE 1,974,127

BALL BEARING SPACER

Michael H. Sullivan, Poughkeepsie, N. Y.

Application July 6, 1933, Serial No. 679,246

7 Claims. (Cl. 308—201)

The invention relates to spacers for ball bearings of the conventional type comprising inner and outer race rings, bearing balls between said rings engaging the races thereof, and an annular spacer holding said balls in properly spaced relation. The space between the inner and outer race rings is necessarily limited, but into this space, the two side rings of the spacer must be inserted and fastened together in proper relation with the balls. Many of the spacers previously used are so complicated due to connecting lugs, webs or tongues, or weakened by rivet or other holes, that in fastening the two side rings together, they become distorted to an extent at which they seriously bind against the balls, interfering with free rotation of the latter, and in use, the side rings of the spacer can very often break apart, disabling the bearing.

It is the principal object of my invention to provide a new and improved spacer in which prior difficulties are effectively overcome, by drawing to the abutments of the spacer rings, superfluous metal from the original blank to reinforce them before final blanking or forming of the ball sockets, and when the spacer rings are finished for assembling, to secure them against separation, by interlocking the reinforcement parts. As these reinforcement parts are definitely and accurately located with respect to the ball sockets prior to assembly, the spacer is fool-proof in assembling. Moreover, the reinforcement parts when interlocked, insure a much more efficient and durable spacer. No openings of any kind are cut from the side rings of the spacer to provide for the reception of rivets, tongues or the like. On the contrary the improved structure strengthens rather than weakens the abutments. To accomplish this, the abutments of the two side rings, before blanking or shaping the ball sockets therein, are punched to provide small male and female portions which are adapted to interfit only when the rings are in proper relation to accurately engage the balls without binding thereon. After proper positioning of the side rings and interfitting of the male and female punched portions, these portions are distorted into interlocking relation with each other so that the side rings of the spacer cannot be separated by thrusts from any direction.

The advantages of the improved construction are many. The two side rings of the spacer, without lugs, webs or tongues, will require a smaller blank and therefore use less material. The punched out metal which forms the interfitting male and female portions, does not weaken the rings but strengthens the spacer at the abutments where strength is necessary, and no matter what normal thrusts be received by the spacer, the side rings thereof will not separate under load. The absence of lugs, webs or tongues in the spacer, will permit the use of thicker metal to counteract the shocks and strains of heavy duty loads, whereas spacers employing lugs, webs or tongues can only be constructed from light material as the space between the inner and outer race rings of the bearing is too limited to allow the use of thick material. The absence of bent lugs, webs or tongues makes assembling much easier and less expensive, and assures a better finished product. All of the work can be done by more simple tools than ordinarily, requiring plain punch and die work, and the tools used are therefore such that they have no tendency to distort the spacer, as when clamping lugs, tongues, rivets, etc.

Fig. 1 of the accompanying drawing is a side elevation of a complete ball bearing embodying the improved spacer.

Fig. 2 is a diametrical sectional view on line 2—2 of Fig. 1.

Fig. 3 is an enlarged detail sectional view on line 3—3 of Fig. 1.

Figs. 4 and 5 are detail sections showing the steps of punching out the male and female portions from the abutments of the side rings, without cutting any metal from said rings.

Fig. 6 is a detail sectional view showing the two side rings properly engaged with each other and illustrating the dies used for distorting the interfitted male and female portions into interlocking relation.

Fig. 7 is a view similar to Fig. 6 but showing said male and female portions bulged into interlocked relation.

In the drawing above briefly described, 10 denotes the outer race ring, 11 refers to the inner race ring, 12 denotes the bearing balls engaging the races of the two rings, and 13 refers to the spacer as a whole, for holding said balls in properly spaced relation.

The spacer 13 is formed from two side rings 14 having circumferentially spaced ball sockets 15 and pairs of flat contacting abutments 16 between said sockets.

One of the abutments 16 of each contacting pair of said abutments is punched between the edges of the ring 14 without cutting any metal therefrom, to provide a male dome-like portion 17. The corresponding portion of the other abutment of said pair, is similarly punched without cutting any metal therefrom, to provide a dome-like female portion 18. These punching operations are performed preferably before the ball sockets 15 are stamped into shape, to overcome any liability of even minutely changing the shape of said sockets.

After the balls 12 are positioned between the rings 10 and 11 in the customary manner, the side rings 14 of the spacer are inserted and they can only fit properly together when the male and female portions 17 and 18 are interfitted, it being thus insured that the ball sockets 15 shall be in proper anti-frictional relation with the balls. After interfitting the portions 17 and 18, a press is used having suitably shaped dies 19 and 20, for exerting endwise pressure upon all of said interfitted portions, as seen in Figs. 6 and 7. This pressure distorts the portions 17 and 18 into bulged interlocking relation with each other as seen in Fig. 7 and also in Fig. 3. In assuming this relation, it will be observed that the free end of the portion 17 has obtained a larger diameter than the attached end of said portion, and that the closed end of the portion 18 has received a larger internal diameter than the open end of this portion. The abutments 16 of the rings 14 are thus so securely fastened together that they cannot be separated without the use of force greatly in excess of that encountered during operation of the bearing.

Particular attention is invited to the fact that each of the interlocked fastening elements 17—18 is of unbroken cross-section throughout its diameter, in all conceivable planes extending diametrically therethrough. Furthermore, the contacting portions of the rings 14 immediately surrounding the interlocked fastening elements are imperforate. Neither ring is therefore weakened to any extent whatever by the formation of the fastening elements. On the contrary, the contacting portions of the rings are stiffened or reinforced by the structure and interlocked relation of the fastening elements.

While the present disclosure is preferably followed, variations may, of course, be made within the scope of the invention as claimed.

I claim:

1. In a ball bearing spacer having side rings, interfitting fastening elements integral with said rings and interlocked against movement in all directions, said rings being imperforate insofar as the formation of said interfitting fastening elements is concerned.

2. In a ball bearing spacer having side rings, interfitting circular fastening elements integral with said rings and interlocked against movement in all directions, said rings being imperforate insofar as the formation of said interfitting fastening elements is concerned.

3. A ball spacer comprising two side rings provided with spaced ball sockets and having pairs of contacting abutments between said sockets, said rings having integral circumferentially spaced tightly interlocked elements formed from parts of said abutments between the inner and outer edges of the rings, none of the metal of said rings being cut therefrom in forming said interlocked portions.

4. A ball spacer comprising two side rings provided with spaced ball sockets and having pairs of contacting abutments between said sockets, said rings having integral circumferentially spaced tightly interlocked male and female elements formed from parts of said abutments between the inner and outer edges of the rings, none of the metal of said rings being cut therefrom in forming said interlocked portions.

5. A ball spacer comprising two side rings provided with spaced ball sockets and having pairs of contacting abutments between said sockets, one abutment of each pair having an integral male portion of larger diameter at its free end than at its attached end, the other abutment of each pair having an integral female portion of larger internal diameter at its closed end than at its open end, said male portion being tightly held in said female portion.

6. A ball spacer comprising two side rings provided with spaced ball sockets and having pairs of contacting abutments between said sockets, one abutment of each pair having an integral dome-like male portion stamped therefrom and of larger diameter at its free end than at its attached end, the other abutment of each pair having an integral dome-like female portion stamped therefrom and of larger internal diameter at its closed end than at its open end, said male portion being tightly held in said female portion.

7. In a ball bearing spacer having two contacting rings, a series of fastening elements integral with one of said rings, each fastening element being of unbroken cross section throughout its diameter in all conceivable planes extending diametrically therethough, an additional series of fastening elements integral with the other of said rings, each additional fastening element being of unbroken cross section throughout its diameter in all conceivable planes extending diametrically therethrough, the two series of fastening elements being interlocked against relative movement in all directions, said rings having contacting imperforate portions immediately surrounding said interlocked fastening elements.

MICHAEL H. SULLIVAN.